United States Patent

Beck et al.

[11] Patent Number: 5,848,141
[45] Date of Patent: Dec. 8, 1998

[54] METHOD AND APPARATUS FOR PROVISIONING CALL PROCESSING RECORDS USING LOGIC AND DATA TEMPLATES

[75] Inventors: Douglas Beck, Colorado Springs, Colo.; Jeffrey R. Evans, Annapolis, Md.; Gregory M. Fisher, North Brunswick, N.J.; Donald E. Gillespie, Boulder, Colo.; Sary Tauv, Somerset, N.J.; Lei-Lei Wang, Princeton Junction, N.J.

[73] Assignee: Bell Communications Research, Inc., Morristown, N.J.

[21] Appl. No.: 757,309

[22] Filed: Nov. 27, 1996

[51] Int. Cl.$^6$ .......................... H04M 3/42; H04M 11/00
[52] U.S. Cl. .................. 379/201; 379/201; 379/93.01; 379/207
[58] Field of Search ............................. 379/201, 93.01, 379/243, 244, 203, 204, 207, 220

[56] References Cited

U.S. PATENT DOCUMENTS

| 5,323,452 | 6/1994 | Dickman et al. ................. 379/201 |
| 5,345,380 | 9/1994 | Babson, III et al. ............. 379/201 |
| 5,450,480 | 9/1995 | Man et al. ....................... 379/201 |
| 5,455,853 | 10/1995 | Cebulka et al. .................. 379/201 |
| 5,463,682 | 10/1995 | Fisher et al. .................... 379/201 |
| 5,608,789 | 3/1997 | Fisher et al. .................... 379/201 |

*Primary Examiner*—Harry S. Hong
*Assistant Examiner*—Benny Q. Tieu
*Attorney, Agent, or Firm*—Joseph Giordano; David A. Hey; Loria B. Yeadon

[57] ABSTRACT

A system and method for creating a call processing record that receives a provisioning request including call data, a logic template identifier, and one or more data template identifiers. The logic template and the data templates are identified based on the logic template identifier and the data template identifiers. The templates are accessed and the call data is inserted into call variables in the templates to create a call processing record with multiple blocks.

13 Claims, 11 Drawing Sheets

CTC CODE-ESTABLISH, CHANGE, MOVE, SWAP ——— 605
PROVISIONING ID-THE LOGIC TEMPLATE NAME FOR THIS CPR —— 610
ACTION- (N FOR A NEW VIEW AND O FOR AN OLD VIEW)
TN-THE NAME FOR THE SUBSCRIBER'S CPR

AINS STRUCTURE                                     ─ 620

SERVICE ID-THE NAME OF THE DATA TEMPLATE
SERVICE ID VALUE-A, D, OR U (A MEANS ADD DATA BLOCK, D MEANS DELETE, AND U MEANS UPDATE)

630

| TAG ID |
| TAG VALUE |

| TAG ID |
| TAG VALUE |

| TAG ID |
| TAG VALUE |

· · ·

AINS STRUCTURE

SERVICE ID-THE NAME OF THE DATA TEMPLATE
SERVICE ID VALUE-A, D, OR U (A MEANS ADD DATA BLOCK, D MEANS DELETE, AND U MEANS UPDATE)

| TAG ID |
| TAG VALUE |

| TAG ID |
| TAG VALUE |

| TAG ID |
| TAG VALUE |

· · ·

· · ·

METHOD AND APPARATUS FOR PROVISIONING CALL PROCESSING RECORDS USING LOGIC AND DATA TEMPLATES

CROSS REFERENCE TO RELATED APPLICATIONS

This application is related to U.S. patent application Ser. No. 08/168,612, entitled "A Network-Based Telephone System Having Interactive Capabilities," filed Jan. 31, 1995, now U.S. Pat. No. 5,519,772; U.S. patent application Ser. No. 07/934,240, entitled "System and Method for Creating, Transferring, and Monitoring Services in a Telecommunications System," filed Aug. 25, 1992, now abandoned; U.S. patent application Ser. No. 07/972,529, entitled "System and Method for Creating, Transferring, and Monitoring Services in a Telecommunications System," now abandoned; U.S. patent application Ser. No. 07/972,817 entitled, "A Method of Creating a Telecommunications Services Specification," filed Nov. 6, 1992, now U.S. Pat. No. 5,450,480; U.S. patent application Ser. No. 07/629,372, entitled "Visual Programming of Telephone Network Call Processing Logic," filed Dec. 18, 1990, now Dickman, et. al., U.S. Pat. No. 5,323,452; and U.S. patent application Ser. No. 07/972,813, entitled "Method of Creating a Telecommunications Service Template," filed Nov. 6, 1992, now Cebulka, et. al., U.S. Pat. No. 5,455,853. Copending U.S. patent application Ser. No. 08/757,308 by Wang et al. entitled "Method and Apparatus for Provisioning Customized Telecommunications Services," filed concurrently is herein incorporated by reference.

BACKGROUND OF THE INVENTION

The present invention relates generally to the field of customized telecommunication services and more specifically to providing a system for changing data and services in call processing records.

The telecommunications industry is constantly providing new services to its customers. As the number and type of services increases, so too does the demand for systems for setting up and maintaining these services efficiently. One system in wide use provides several services, but requires trained personnel to effect these services. When a customer wants a new service or a change in service, the customer's local telecommunications site, such as the local telephone company, creates and sends a service order to a service activation controller (SAC). The SAC transmits this service order to a service operator at a service management system. The service operator, a skilled telecommunications technician, then generates a call processing record (CPR) to implement the new or changed service by entering the service request in to a services management system, such as Bellcore's Service Provisioning, Activation, and Creation Environment (SPACE®) system.

A CPR defines how the telephone switching system processes a received telephone call for a particular customer. To activate a CPR, the service operator must transfer the CPR to an integrated service control point (ISCP), which implements the services. A multi-services application platform (MSAP) in the ISCP accesses a CPR based on received calls. The MSAP processes nodes in the CPR and issues corresponding call processing instructions back to the switch. The switch then routes the calls according to these instructions.

A service operator may use a template to create the CPR, as discussed in U.S. Pat. No. 5,455,853, which is herein incorporated by reference. The service operator must insert data into templates to create CPRs and then sequentially activate the CPRs by sending them to the MSAP of ISCP for use during call processing. Templates aid in the construction of CPRS. It is impractical and inefficient to require a user to build the same graph for every customer requesting the same service. Templates are a "form" for creating a customer specific version of a service. Customer specific versions of a service are established by providing values for "customizable" expressions or variables in a node, branch, or call variable within a template. In this manner, the template allows the same service to be provided to more than one customer without having to rebuild the entire graph or redefine generic call variables in the CPR establishing the service.

Copending U.S. patent application Ser. No. 08/757,308, entitled "Method and Apparatus for Provisioning Customized Telecommunications Services," discloses a system for provisioning customized telecommunications services automatically, without requiring the user to manually activate CPRs. This system stores subscriber data in template-based CPRs having data and logic to transfer control to a feature CPR. FIG. 1A shows a logic template with a call variables window 913 and a logic graph 925. Logic graph 925 includes nodes that correspond to call processing instructions. Call variable window 913 includes the name of the call variables, the data type of each variable, such as integer, and a location of where the call variable is defined.

A CPR based only on a logic template, however, cannot be updated by changing the data type of call variables, nor can call variables associated with new services be added or deleted via the provisioning process. Instead, the system must perform CPR migration which is a manual process and is time consuming and involves editing the feature CPR and each associated template based CPR.

A CPR migration process includes running three main tools. A first tool writes to a text file all the template based CPR names which have been created from a certain template. Then a second tool prints out all the call variables in the certain template based CPR, the variables each having a tag with the name of the call variable in the template and the value of the call variable. If a user wants to migrate the CPRs in the list from the current template to a new template with new services, he has to modify the text file created from the second tool by adding a new template name, the new call variables and value pairs. In addition, the user can specify the value of the call variables in the old template to be carried over to the new call variables in the new template. After modification, the file is called the conversion file.

The third tool moves or migrates all the CPRs produced by the first tool to a new template with new call variables specified in the conversion file. If the new call variable in the new template has the same name as a call variable in the old template, then the value of the call variable in the old template can be carried over or overwritten based on the conversion file. A user may have to wait hours or days for the completion of the migration, and during this time, the user must use the old template for provisioning new CPRS.

To avoid migration, a user may create a template with all current and future features and use this to provision the CPR for all subscribers. If there are ten features, for example, then all ten features must be provisioned even if a subscriber only uses one feature. This wastes valuable space in the database.

SUMMARY OF THE INVENTION

The present invention provides separate logic and data templates to allow for the creation of a CPR with multiple services associated with multiple data templates, and to allow deletion, updates, modification, and addition of call variables associated with a data template without affecting the rest of the CPR. Logic templates can be swapped without affecting call variables included in the CPR.

In one implementation of the present invention, a system is provided for creating a call processing record that includes a memory containing a plurality of logic templates and a plurality of data templates. Structure is provided for selecting a logic template from the plurality of templates, selecting one or more data templates from the plurality of templates, and forming a logic block and a data block by inserting received data into the selected logic and data templates. The system groups the formed logic and data blocks in a call processing record.

A method is provided for modifying a call processing record comprising the steps of receiving a first provisioning request, including first call data, a first logic template identifier, one or more data template identifiers for modifying the call processing record; accessing from a memory, a first logic template based on the first logic template identifier and a one or more data templates based on the data template identifiers; inserting the first call data as call variables into the first logic template to generate a first logic block and into the data templates to generate a data blocks; and grouping the first logic block and first data blocks into a call processing record.

BRIEF DESCRIPTION OF THE DRAWINGS

The accompanying drawings, which are incorporated in and constitute a part of the specification, illustrate preferred implementations of this invention and, together with the general description above and the detailed description of the preferred implementations given below, serve to explain the principles of the invention.

In the drawings:

FIG. 6 shows an example of a provisioning message structure in accordance with the present invention;

BEST MODE FOR CARRYING OUT THE INVENTION

Reference will now be made in detail to the construction and operation of preferred implementations of the present invention which are illustrated in the accompanying drawings.

Figure 2:
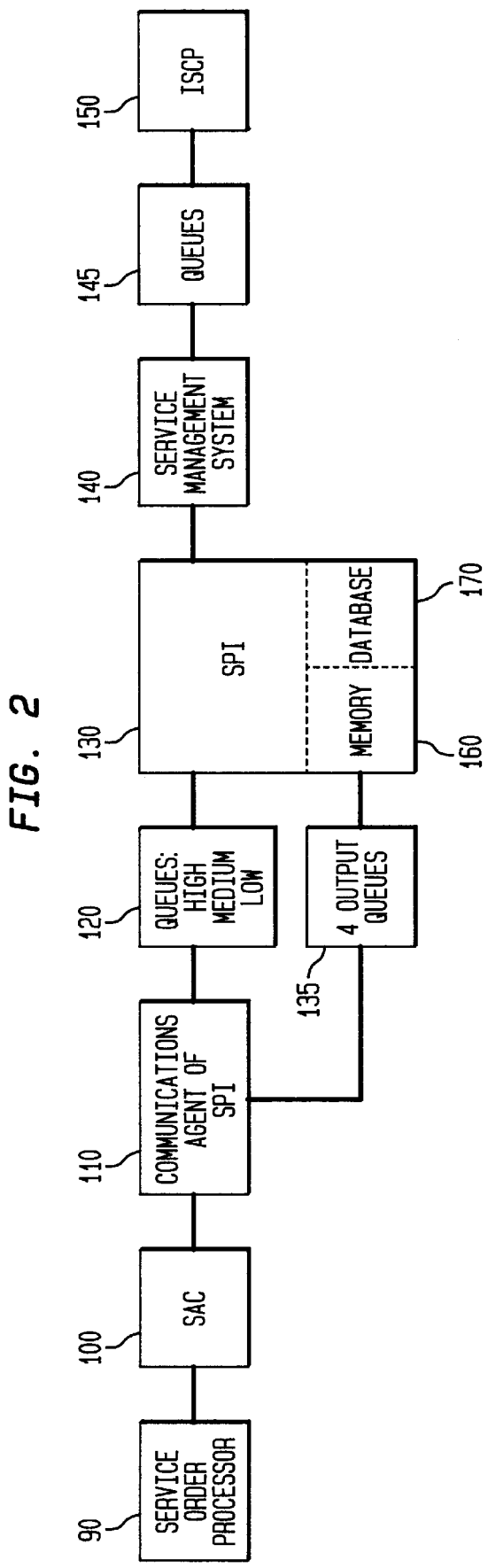
FIG. 2 is a block diagram of a system for processing a service provisioning message in accordance with the present invention.

FIG. 2 shows a block diagram of a service processing system in accordance with the present invention. A remote user in a local telephone company enters a service order to a service order processor 90, and service order processor 90 enters the service order to one of four SACs 100.

SAC 100 sends a provisioning message to a communications agent 110 of Service Provisioning Interface (SPI) 130. SPI communication interface 110 determines a priority level of the provisioning message and places the provisioning message request, with the priority, in one of the queues 120.

A preferred embodiment of the present invention includes three queues 120: a high priority queue, a medium priority queue, and a low priority queue. The communications agent 110 selects a queue 120 based on the determined priority level.

SPI 130 retrieves provisioning message requests from the queues, and, after processing, sends response messages to one of four output queues 135 connected to the communications agent 110, which in turn sends the responses to SAC 100. The four queues each correspond to a different SAC 100.

SPI 130 includes a memory 160 that stores procedures for performing various functions. In performing these procedures, SPI 130 accesses a database 170. Database 170 stores CPRs, tables, templates, and a log. The database may be accessed by both SPI 130 and the service management system 140.

Service management system 140 communicates with an ISCP 150 to activate the service request by placing a service request in a queue 145 for input to the ISCP 150. As discussed above, ISCP 150 carries out call processing and allows the service requested to be used and accessed by telephone systems. The preferred embodiment includes Bellcore's SPACE system as the service management system 140.

The present invention may use multiple templates to provision a template based CPR. As discussed above, templates are "forms" including logic graphs and customizable variables for creating a call processing record for providing a service. In order to carry out the logic in a logic graph there are a plurality of call variables that require values. This invention uses multiple templates to provision a single CPR by providing separate templates one of which has logic, and optionally some call variables, and the remaining each have some of the needed call variables so that the combination of templates has all of the needed call variables.

Figure 1A:
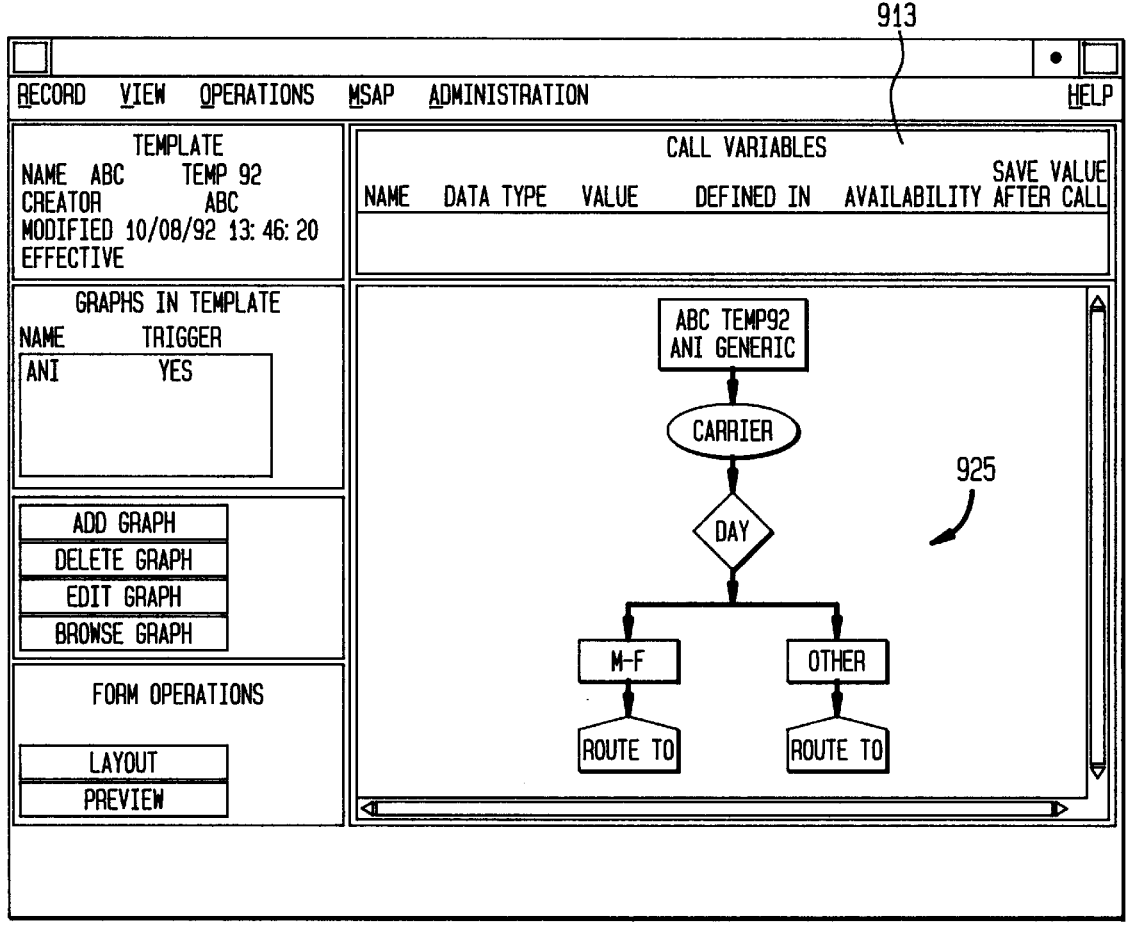
FIG. 1A is a prior art sample template for organizing call logic and data.
Figure 1B:
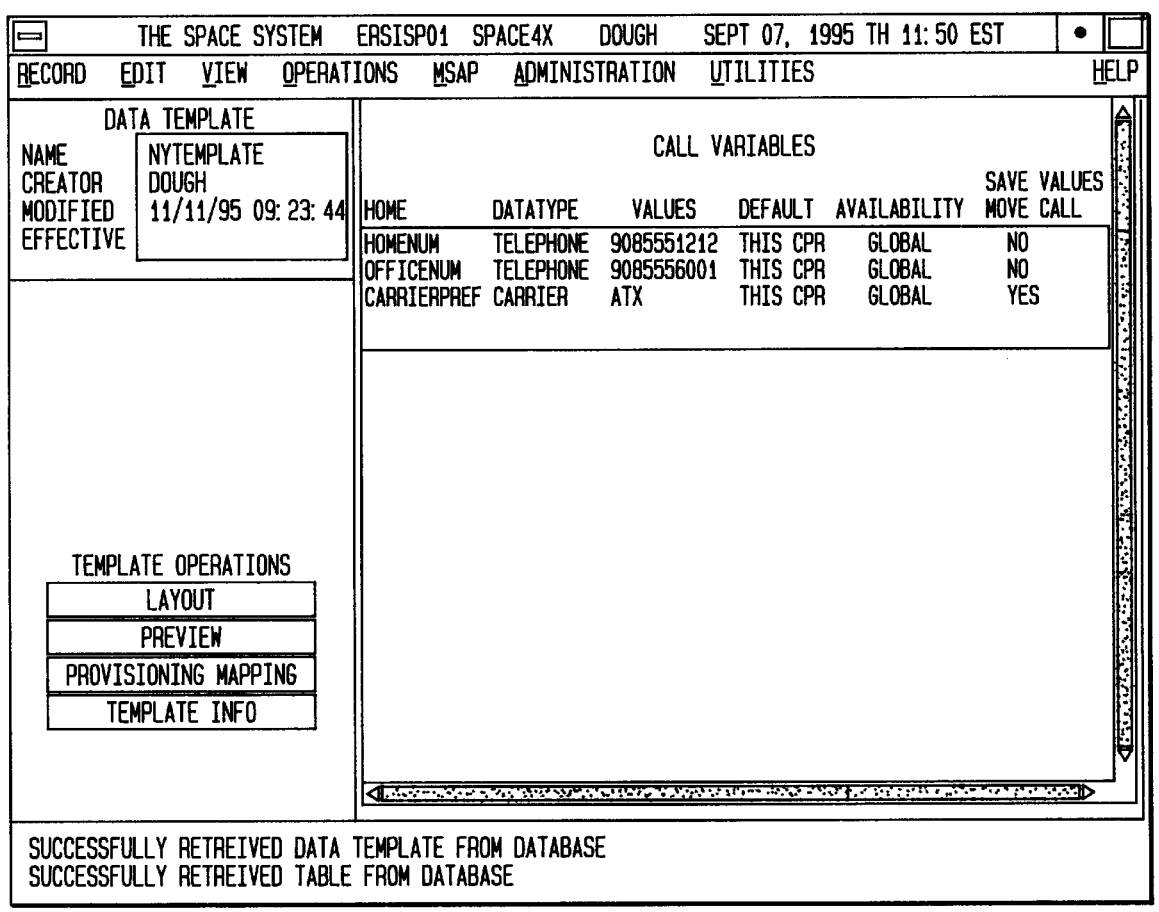
FIG. 1B is a prior art sample data template that contains only data.

In the preferred implementation there are two types of templates: data templates and logic templates. A logic template, such as that shown in FIG. 1A, may contain a representation of logic flow to carry out the service operation desired in the corresponding CPR, and may also contain data for the call variables in the logic flow. Data templates, such as that shown in FIG. 1B, only include the data for the call variables in a service performed by the CPR or part of such service features available in a CPR. A CPR includes several blocks, each corresponding to a template. A block is a template containing data or data and logic that is complete and placed in a CPR. A segregated template-based CPR has one logic block generated from a logic template and data blocks generated from data templates (although data blocks are not required).

Figure 3:
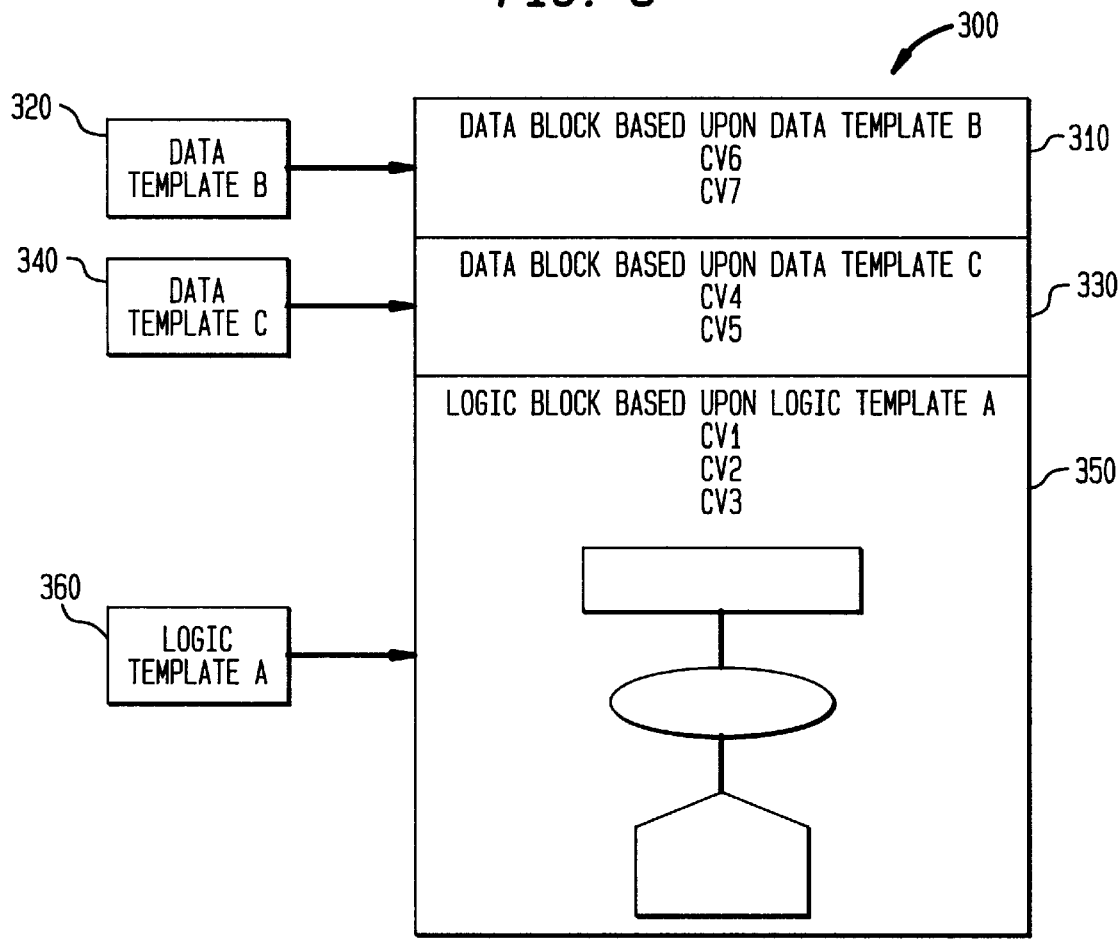
FIG. 3 shows a sample of a CPR created from one logic and two data templates in accordance with the present invention.

FIG. 3 shows a sample multiple template-based CPR 300 with a data block 310 corresponding to data template 320, a data block 330 corresponding to data template 340, and a logic block 350 corresponding to logic template 360.

A CPR created using this block format appears the same to the ISCP as a template-based CPR. Therefore, no change is needed to the ISCP in this invention. The multiple block based CPR of the present invention contains all of the same information as the single template-based CPR. The nodes in the logic of the multiple block based CPR refer to call variables in the CPR and therefore when activated the nodes access the call variables in the CPR so that the ISCP does not need any additional information to activate each node in the logic of the multiple block based CPR.

Logic templates may depend on data templates, and data templates may depend on other data templates. When a logic or data template provisions data that depends upon another data template, the dependent data blocks corresponding to that template must be in the CPR for the logic template.

Figure 4:
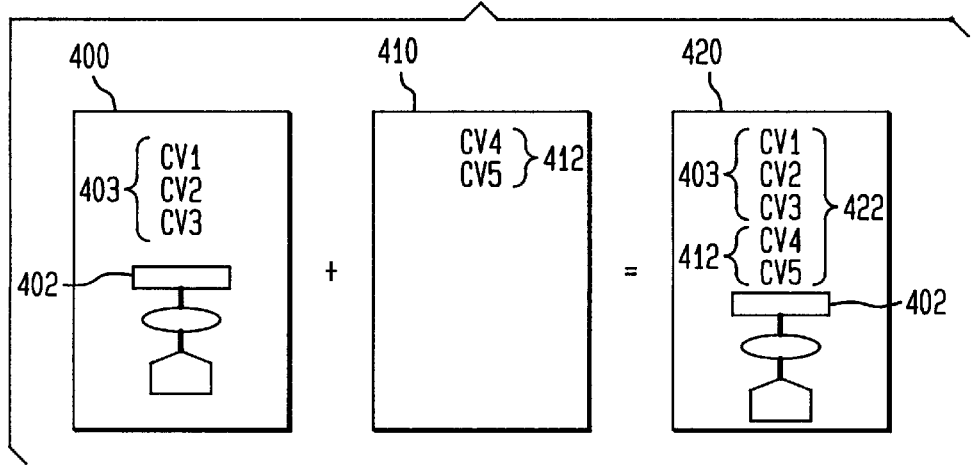
FIG. 4 shows a sample of a dependent logic block in accordance with the present invention.

By way of example, FIG. 4 shows a logic template 400 that depends upon data template 410. Logic template 400 includes logic 402 and three call variables (CV) 403. The service described in the logic 402 requires five call variables 422, three of which are included in the logic block and two of which are defined in data template 410 as call variables 412. Therefore, the service creator delivers logic template 400 as dependent on data template 410 to insure that the proper number, in this case five, of call variables are always present in the CPR 420.

When the provisioning message is to create or delete a CPR, the SAC 100 must include an identifier for the logic template and for any data templates that are to be included in the CPR.

CREATING TEMPLATE-BASED CPR

Figure 5:
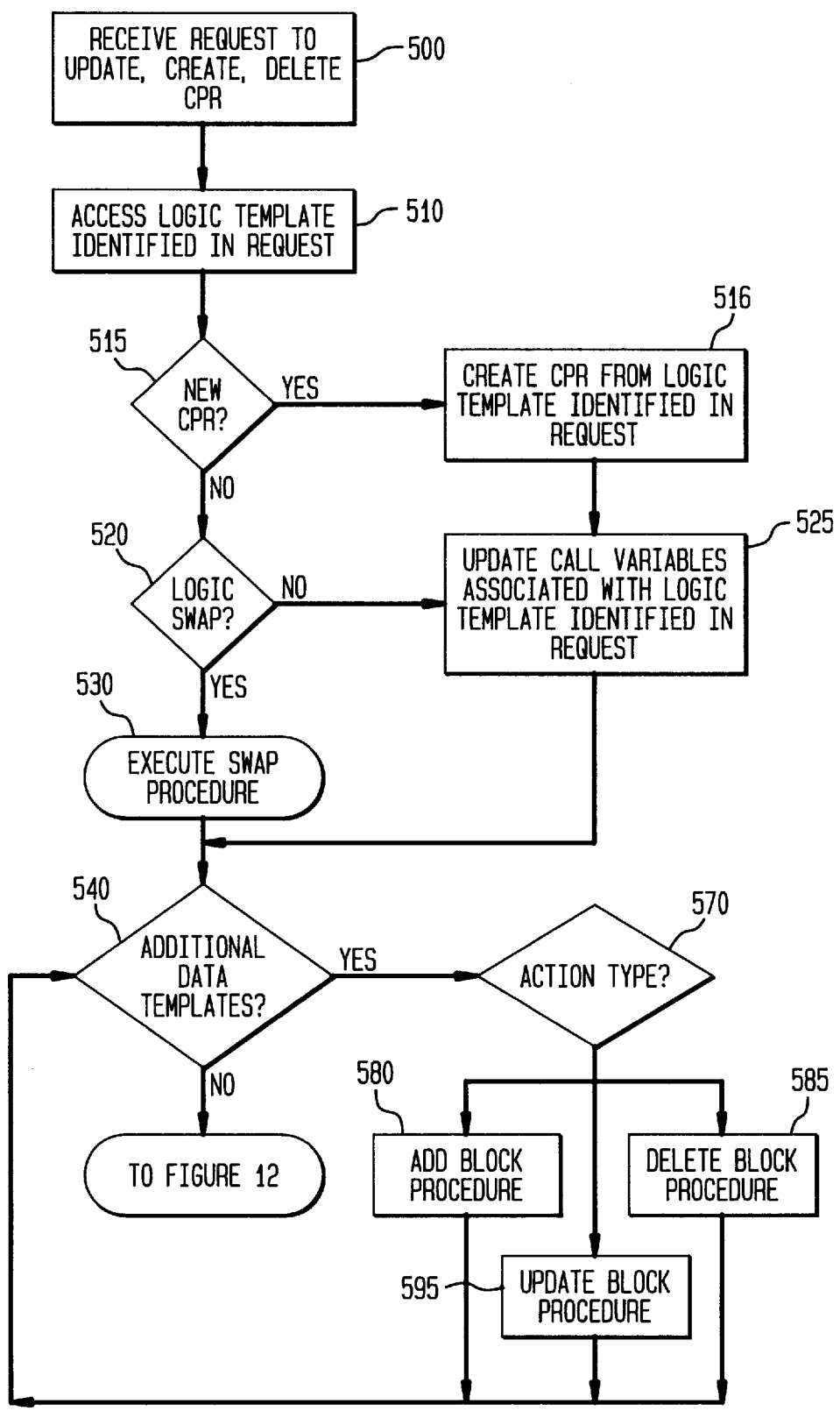
FIG. 5 shows a flowchart of the steps for creating a multiple template based CPR and adding data blocks based on data templates to the CPR in accordance with the present invention.

Preferably, the SPI logic creates a CPR with multiple blocks using the flow chart shown in FIG. 5. After receiving a provisioning message request for the creation, updating, or deleting of a CPR (step 500), SPI 130 initially accesses the logic template identified in the provisioning message (step 510).

FIG. 6 shows a sample provisioning message 600 in accordance with the preferred implementation of this invention. SPI 130 determines which type of provisioning activity to carry out based on the provisioning message request— either a single template based request or a multiple template based request. SPI 130 includes a symbol in the service identifier, such as an exclamation point, in order to distinguish between data block names and call variables. A code 605 represents the action to be performed on a logic block of the CPR, a provisioning identifier 610 indicates which logic template is associated with the CPR to be updated, and several service identifiers 620 identify the data templates corresponding to this provisioning message. Each data template service identifier 620 also includes a service identification value 630 of A, D or U that respectively, indicate a request for adding, deleting and updating. SPI then determines whether a new CPR is required (step 515), and if so creates a CPR from the identified logic template in the request (step 516). Otherwise, SPI 130 determines whether a logic swap is requested (step 520). If so, a logic swap is executed (step 530).

Figure 7:
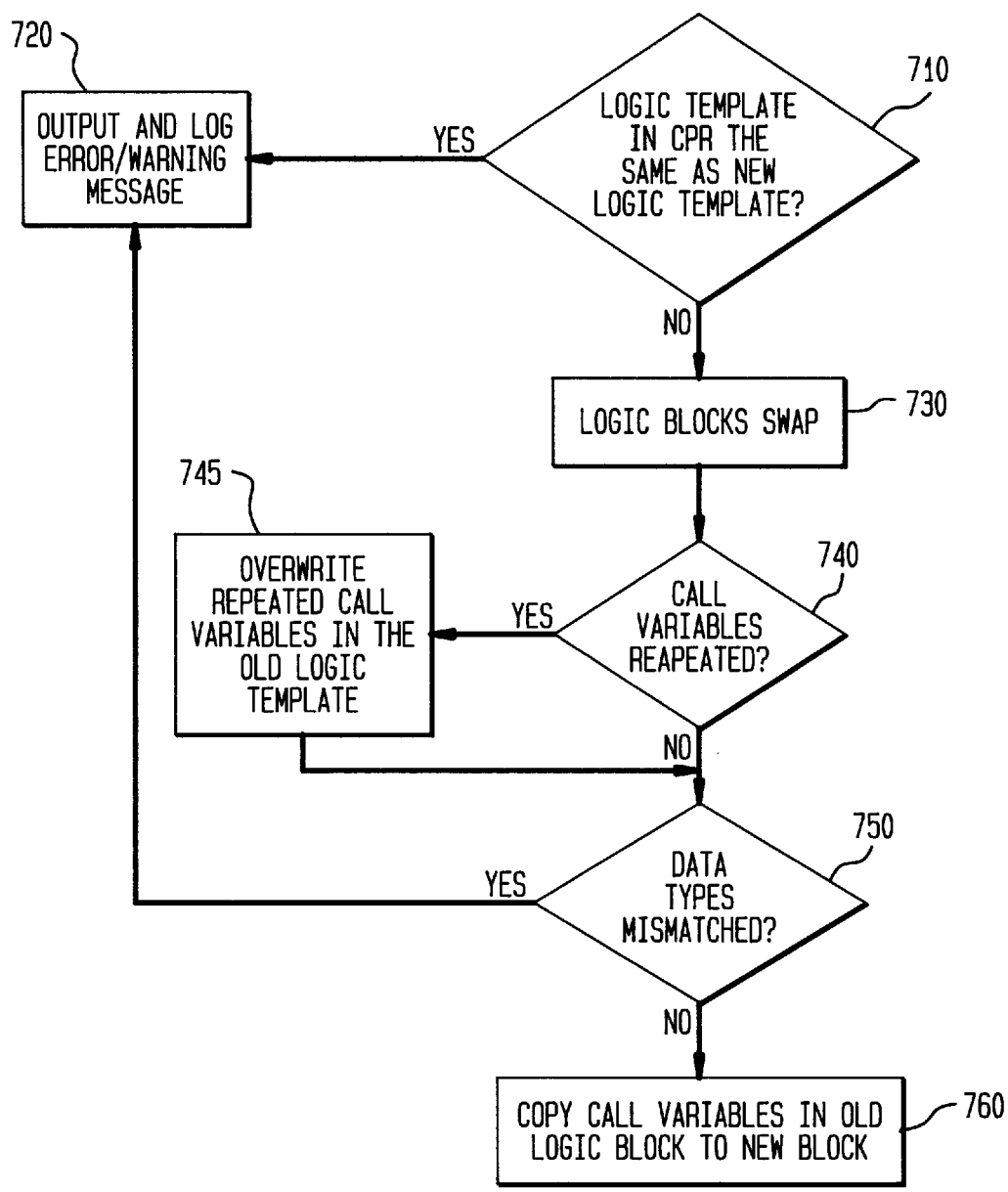
FIG. 7 shows a flowchart of the steps for swapping logic blocks in a CPR in accordance with the present invention.

FIG. 7 shows the steps for processing a swap request. SPI 130 determines whether the logic template that exists in the CPR is the same as the new logic template to be inserted (step 710). If so, SPI 130 sends an error message to the SAC 100 and logs an error message in database 170 (step 720). Processing returns to awaiting and receiving additional requests.

Otherwise, the old and new logic template are swapped (step 730). SPI 130 compares call variables associated with the new logic block to the old logic block (step 740). If any call variables exist in both blocks, the SPI 130 writes over the coexisting call variables in the old logic block with the call variables in the new logic block (step 745).

Otherwise, SPI 130 checks whether each of the call variables have corresponding data types so there is no mismatch between the call variables expected and the call data received (step 750). If there is a mismatch, SPI 130 logs an error and sends a warning message to SAC 100 (step 720).

Otherwise, SPI 130 copies the call variable value from the old logic block into the new logic block (step 760). Processing then continues.

Figure 8A:
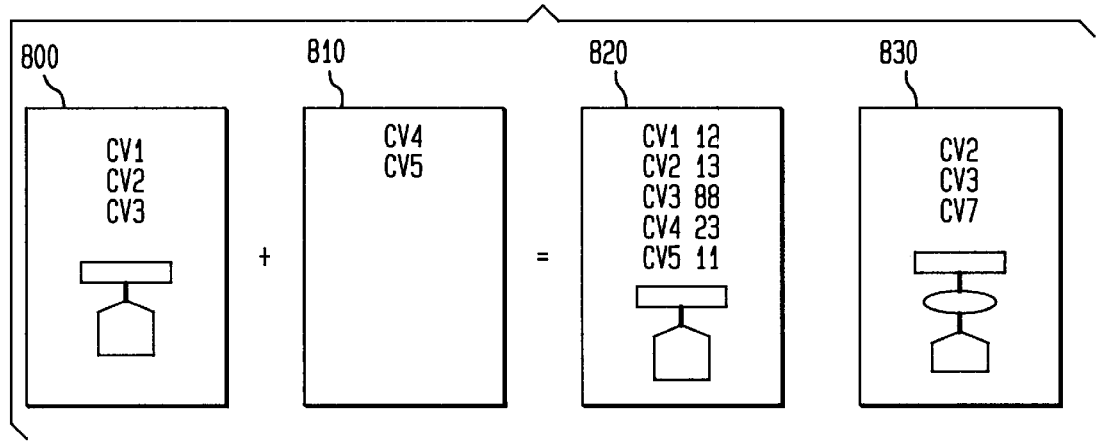
FIG. 8A shows an example of a preswapping operation for a CPR in accordance with the present invention.
Figure 8B:
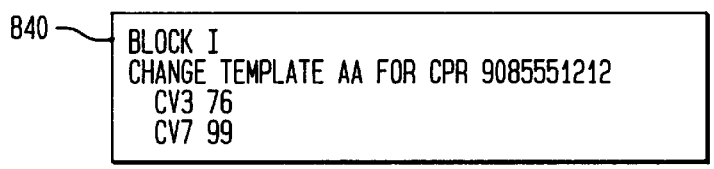
FIG. 8B shows a provisioning message corresponding to the sample swapping operation in FIG. 8A.
Figure 8C:
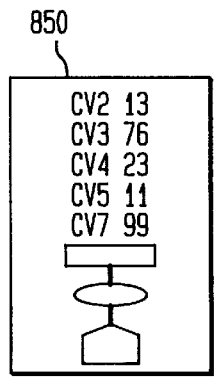
FIG. 8C shows a multiple template-based call processing record resulting from the swapping operation of FIG. 8A.

FIGS. 8A–8C show a sample swapping operation. FIG. 8A shows a CPR 820 based on logic template 800 and data template 810. Logic template 830 is to be swapped with logic template 800.

SPI 130 receives the provisioning message 840, shown in FIG. 8B, for initiating the swapping function. Provisioning message 840 includes an identifier AA and data CV3 and CV7 that correspond to the new logic template 830.

FIG. 8C shows the CPR 850 resulting from the swapping operation. The call variables in data block 810 are unaffected and CV2 retains the same data value since the new logic template did not overwrite CV2. CV1 is no longer in the CPR, and CV7 has been added as a result of the swapping function.

Returning to FIG. 5, after the logic swap or after creating the CPR from the logic block, SPI 130 determines if there are additional data templates in the request (step 540). If so, the flow goes to step 570 to determine the action type to be performed. After determining the type of action requested by looking at the service identifier (step 570), processing continues with the procedure in FIG. 9 for an "add block request" (service identifier A) (step 580), or with the procedure in FIG. 11 for an update block request (service identifier U) (step 595), or with procedure shown in FIG. 10 for deleting a block (step 585). When it is found that no additional data templates need to be processed (step 540) processing continues with FIG. 12.

Figure 9:
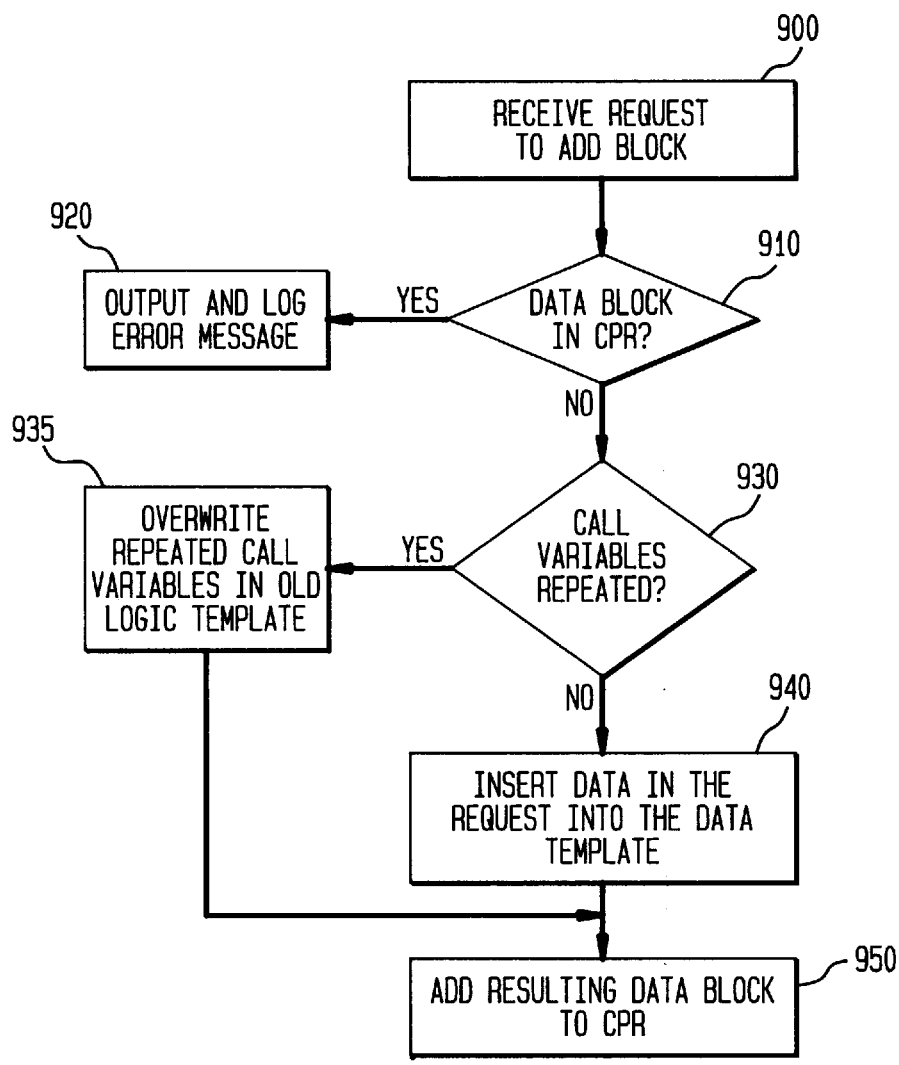
FIG. 9 shows a flowchart of the steps for changing a multiple template based CPR in accordance with the present invention to add a data block.

FIG. 9 shows the procedure 900 for processing a block request as in step 580. After receiving a request to add a data block based on a given data template (step 900), a determination is made whether the data block already exists in the CPR (step 910). If so, an error message is logged to database 170 and output to SAC 100 (step 920). Otherwise, SPI 130 determines whether call variables listed in the data template are also listed in the logic template or in another data template associated with this CPR (step 930). If call variables are repeated, the SPI 130 overwrites the value of the coexisting call variable with the new value provided in the data block (step 935). Otherwise, SPI 130 inserts data in the request into the data template, thereby generating a data block (step 940). SPI 130 sequentially processes each data block and adds the data block to the CPR (step 950).

Figure 10:
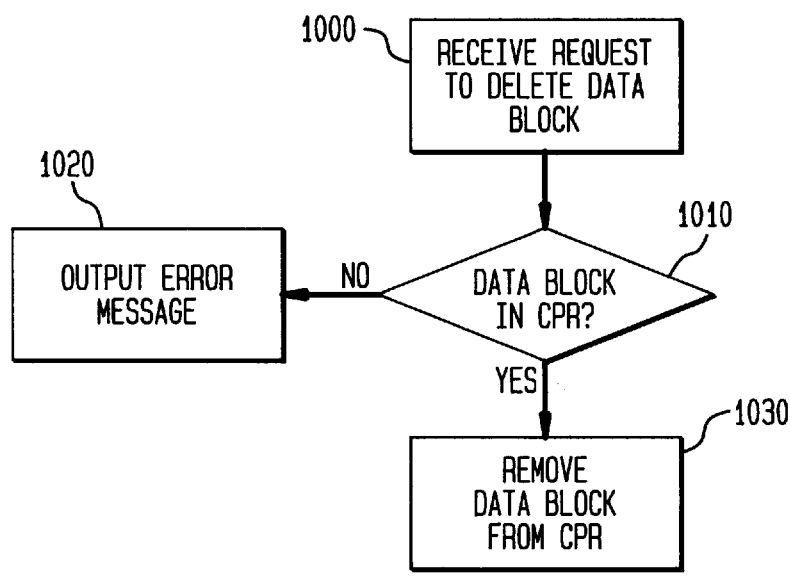
FIG. 10 shows a flowchart of the steps for deleting a data block associated with a data template in a CPR in accordance with the present invention.

FIG. 10 shows the procedure for processing a delete data block request received (step 1000). SPI 130 determines whether the data block exists in the CPR (step 1010) and logs and outputs an error message when the data block is not present (step 1020). Otherwise, SPI 130 removes the data block from the CPR (step 1030).

Figure 11:
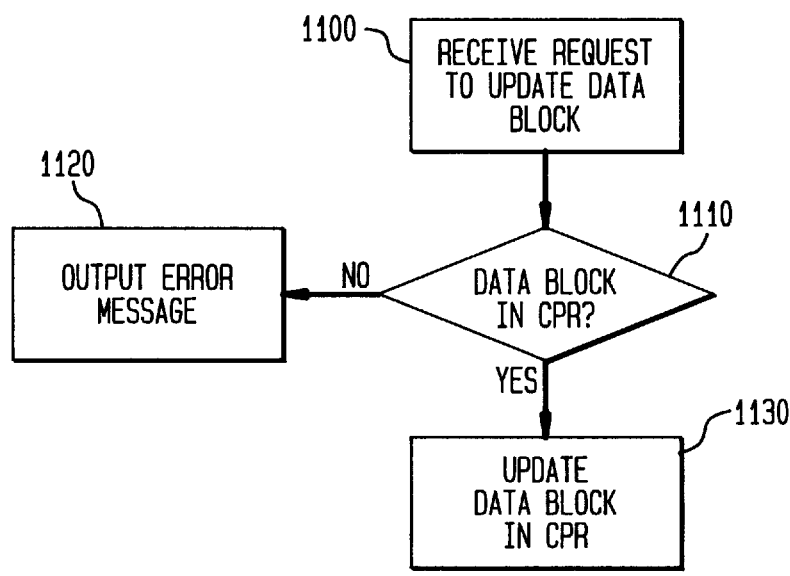
FIG. 11 shows a flowchart of the steps for updating a multiple template based CPR in accordance with the present invention.

FIG. 11 shows the procedure 900 for updating the data block template as in step 595 for a received data update request (step 1100). SPI 130 determines whether the data block exists in the CPR (step 1110). If not, SPI logs and outputs an error message when the data block (step 1120). Otherwise the data block in the CPR is updated with data in the provisioning message (step 1130).

Figure 12:
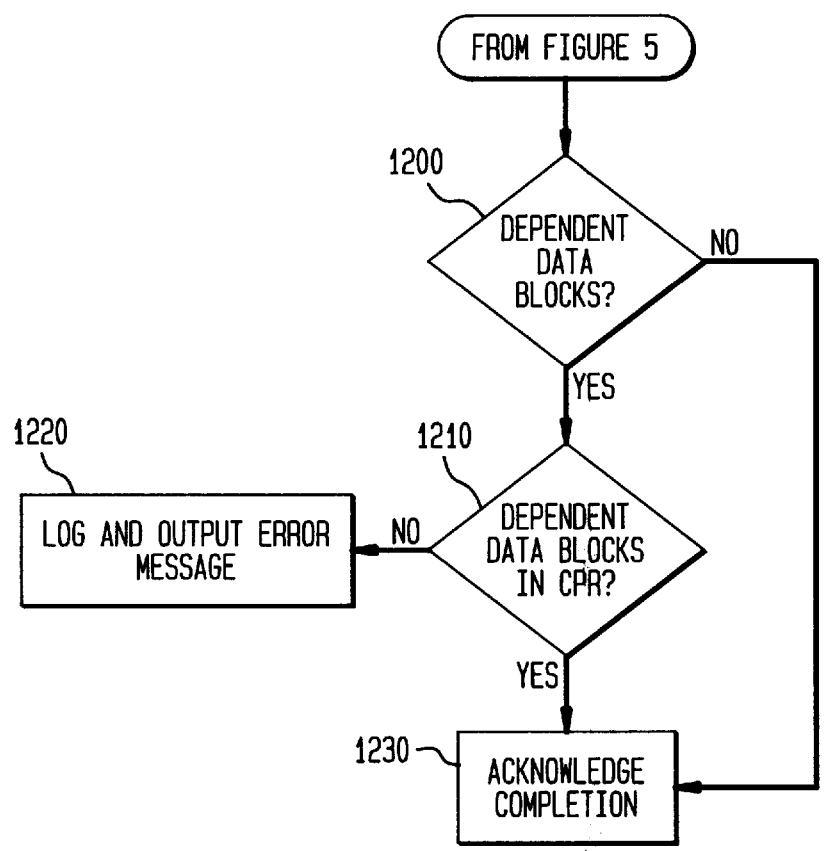
FIG. 12 shows a flowchart of the steps for checking dependent data blocks in accordance with the present invention.

After performing the procedure corresponding to the data block, the request is carried out, and processing continues with the flow chart shown in FIG. 12.

As shown in FIG. 12, SPI 130 determines whether the logic template or any of the data templates added to the CPR refer to dependent data templates (step 1200). If so, SPI 130 verifies whether each dependent data template has been added to the CPR (step 1210). If not, an error message is logged in database 170 and output to the SAC 100 (step 1220). If there are no dependent data blocks or all dependent data blocks appear in the CPR, a completion acknowledgment message is sent to the SAC 100 (step 1230).

CONCLUSION

By allowing a CPR to be created from separate logic and data templates, the present invention allows for the deletion, updates, and addition of call variables in a CPR without affecting the rest of the CPR. The separate templates allow for updating and creating a CPR without migration providing for a faster and more efficient system.

The foregoing description of preferred embodiments of the invention has been presented for illustration and description. It does not exhaust all implementations of the invention or limit the invention to the precise form disclosed. Modifications and variations are possible in light of the above teachings or may be acquired from practice of the invention. The embodiments explain the principles of the invention and its practical application to enable one skilled in the art to make and use the invention in various embodiments and with various modifications as are suited to the particular use contemplated. The scope of the invention is defined by the following claims and their equivalents.

We claim:

1. A method for generating a segregated call processing record used for service implementation in a communications network without operator intervention, said method comprising the steps, executed on a processor, of:

receiving a provisioning message based on the service to be implemented, said received provisioning request message having a provisioning identifier for a logic template, action codes, and at least one service identifier, each service identifier having a service value and corresponding to a data template;

retrieving from a database an identified logic template based on the provisioning identifier and a first identified data template corresponding to a first service identifier; and in response to the action code, generating a segregated call processing record having a logic block based on said retrieved logic template and a first data block based on said retrieved first data template and wherein the logic block and the first data block are segregated.

2. The method in accordance with claim 1 wherein the logic template includes a logic graph having call processing variables required to implement the service, the call processing variables having logic flow data.

3. The method in accordance with claim 2 wherein the identified data templates include only data for customizable service call variables.

4. The method in accordance with claim 3 wherein the action codes indicate a logic swap for an old call processing record, the old call processing record created based on an old logic template, and said segregated call processing record generation step further comprises the steps of:

comparing said retrieved logic template to the old logic template;

stopping processing and generating a logic match error message if said comparison indicates that said retrieved logic template and the old logic template are the same;

swapping the old logic template with said retrieved logic template if said comparison indicates that said retrieved logic template and the old logic template are not the same, including the substeps of;

checking the retrieved logic template logic data against the old logic template logic data, generating a warning message for each mismatch detected by said checking substep, and copying all matching old logic data from the old logic template to the retrieved logic template to form a swapped logic template; and grouping a logic block based on the swapped logic template with the first data logic block to form said segregated call processing record.

5. The method according to claim 4 wherein the provisioning message indicates a request to add customizable data blocks from the remaining data templates to the segregated call processing record and further comprising the steps of:

obtaining from the database one of the remaining data templates;

generating a data block match error message if said obtained data template customizable data is determined to already exist in the segregated call processing record data block;

adding all nonmatching customizable data blocks to the segregated call processing record;

overwriting all repeated call processing variables in the logic block of the segregated call processing record; and repeating said obtaining, generating, adding and overwriting steps for each of the remaining data templates.

6. The method according to claim 4 wherein the service identifier value indicates a request to delete customizable data blocks from the segregated call processing record and further comprising the steps of:

generating a data block missing error message when any one of the customizable data blocks is determined to be missing from the segregated call processing record; and deleting the data blocks that are determined to exist in the segregated call processing record.

7. The method according to claim 4 wherein the service identifier value indicates a request to update the segregated call processing record using customizable data blocks from the remaining data templates, said method further comprising the steps of:

generating a data block update error message if the customizable data block is determined to be missing from the segregated call processing record; and updating the customizable data blocks indicated in the request from each of the remaining plurality of data templates when the customizable data blocks are determined to exist in the segregated call processing record.

8. The method according to claim 3 wherein the action codes indicate a logic addition and said generating step comprises the step of grouping the logic block based on the retrieved logic template and the first data block to form the segregated call processing record.

9. The method according to claim 8 wherein the provisioning message indicates a request to add customizable data blocks from the remaining data templates to the segregated call processing record and further comprising the steps of:

obtaining from the database one of the remaining data templates;

generating a data block match error message if said obtained data template customizable data is determined to already exist in the segregated call processing record data block;

adding all nonmatching customizable data blocks to the segregated call processing record;

overwriting all repeated call processing variables in the logic block of the segregated call processing record; and repeating said obtaining, generating, adding and overwriting steps for each of the remaining data templates.

10. The method according to claim 8 wherein the service identifier value indicates a request to delete customizable data blocks from the segregated call processing record and further comprising the steps of:

generating a data block missing error message when any one of the customizable data blocks is determined to be missing from the segregated call processing record; and deleting the data blocks that are determined to exist in the segregated call processing record.

11. The method according to claim 8 wherein the service identifier value indicates a request to update the segregated call processing record using customizable data blocks from the remaining data templates, said method further comprising the steps of:

generating a data block update error message when any one of the customizable data blocks is determined to be missing from the segregated call processing record; and updating the data blocks indicated in the request from each of the remaining data templates when the data blocks are determined to exist in the segregated call processing record.

12. The method in accordance with claim 1 further comprising the steps of:

determining whether the logic and data templates used to generate the segregated call processing record refer to dependent data templates;

verifying whether each dependent data template was added to the segregated call processing record based on said determination;

generating a dependent data template error message if a dependent data template is found missing based on said verification; and generating a process completion message at the end of said verification.

13. A system for generating a segregated call processing record used for service implementation in a communications network without operator intervention, said system comprising a database having call processing records, tables, and templates;

means for receiving a provisioning message based on the service to be implemented, the received provisioning message having a provisioning identifier for a logic template, action codes, and at least one service identifier, each service identifier having a service value and corresponding to a data template;

means for retrieving from said database an identified logic template based on the provisioning identifier and an identified data template corresponding to a service identifier; and means in response to an action code for generating a segregated call processing record having a logic block based on the retrieved logic template and a data block based on the received data template and wherein the logic block and the data block are segregated.

* * * * *